(12) United States Patent
Kim et al.

(10) Patent No.: US 8,974,181 B2
(45) Date of Patent: Mar. 10, 2015

(54) ROPE-CONVEYER STRUCTURE FOR SUPPORTING PLATES OF WIND OR WATER POWER GENERATOR

(75) Inventors: Yeong-Saeng Kim, Gimhae-si (KR); Dae-Hee Lee, Gimhae-si (KR)

(73) Assignee: Inje Univ. Industry-Academic Cooperation Foundation (KR)

( * ) Notice: Subject to any disclaimer, the term of this patent is extended or adjusted under 35 U.S.C. 154(b) by 695 days.

(21) Appl. No.: 13/292,318

(22) Filed: Nov. 9, 2011

(65) Prior Publication Data

US 2012/0051910 A1   Mar. 1, 2012

Related U.S. Application Data

(63) Continuation of application No. PCT/KR2010/005293, filed on Aug. 12, 2010.

(30) Foreign Application Priority Data

Jun. 28, 2010 (KR) .................. 10-2010-0061141

(51) Int. Cl.
   *F03B 17/06* (2006.01)
   *F03D 5/02* (2006.01)

(52) U.S. Cl.
   CPC ............... *F03B 17/066* (2013.01); *F03D 5/02* (2013.01); *F05B 2210/16* (2013.01); *F05B 2240/91* (2013.01); *F05B 2240/917* (2013.01); *Y02E 10/38* (2013.01); *Y02E 10/28* (2013.01); *Y02E 10/70* (2013.01); *Y02E 10/725* (2013.01); *Y02E 10/728* (2013.01)
   USPC .................................... 416/8; 415/5; 416/118

(58) Field of Classification Search
   CPC ...... F03B 17/066; F03D 5/02; F05B 2210/16; F05B 2240/91; F05B 2240/917; Y02E 10/28; Y02E 10/38; Y02E 10/70; Y02E 10/725; Y02E 10/728
   USPC .......... 416/7, 8, 12, 17, 118, DIG. 4; 415/2.1, 415/3.1, 4.1, 5, 905, 906; 290/42, 43, 44, 290/53, 54, 55
   See application file for complete search history.

(56) References Cited

U.S. PATENT DOCUMENTS 1,049,724 A * 1/1913 Johnson ........................... 416/8
1,096,332 A * 5/1914 Warden ............................ 416/6
(Continued)

FOREIGN PATENT DOCUMENTS

JP           11182401 A      7/1999
KR      1020090097089 A      9/2009

OTHER PUBLICATIONS

PCT International Search Report (PCT/KR2010/005293), Jun. 16, 2011.

*Primary Examiner* — Liam McDowell
(74) *Attorney, Agent, or Firm* — Park & Associates IP Law, P.C.

(57) ABSTRACT

A rope-conveyor structure for supporting plates of a wind or water power generator, in which plates are coupled to a rope at positions spaced apart from each other so that the force of flowing water or wind applied to the plates rotates the rope. The rope-conveyor structure includes couplings which are coupled to the rope between the plates, and connection wires each of which has a predetermined length. Each connection wire is connected at a first end thereof to the corresponding coupling and at a second end thereof to the corresponding plate. The positions of the connection wires can be selectively changed so that each connection wire can support the corresponding plate in either directions. Therefore, the plates can be prevented from being displaced from the correct positions or from twisting, regardless of the direction of flow of the water.

3 Claims, 2 Drawing Sheets

(56) References Cited

U.S. PATENT DOCUMENTS

| | | | |
|---|---|---|---|
| 1,667,634 A * | 4/1928 | Meekins | 416/8 |
| 1,707,795 A * | 4/1929 | Brown | 416/8 |
| 1,908,429 A * | 5/1933 | Keywood | 416/8 |
| 4,930,985 A * | 6/1990 | Klute | 416/8 |
| 6,809,430 B2 * | 10/2004 | Diederich | 290/54 |
| 6,948,911 B1 * | 9/2005 | Laughton | 416/6 |

* cited by examiner ( a )

( b )

ROPE-CONVEYER STRUCTURE FOR SUPPORTING PLATES OF WIND OR WATER POWER GENERATOR

REFERENCE TO RELATED APPLICATIONS

This is a continuation of pending International Patent Application PCT/KR2010/005293 filed on Aug. 12, 2010, which designates the United States and claims priority of Korean Patent Application No. 10-2010-0061141 filed on Jun. 28, 2010, the entire contents of which are incorporated herein by reference.

FIELD OF THE INVENTION

The present invention relates, in general, to rope-conveyor structures and, more particularly, to a rope-conveyor structure for supporting plates of a wind or water power generator in which connection wires connect the plates to a rope and support the plates when flowing water or wind applies force to the plates.

BACKGROUND OF THE INVENTION

Generally, water power generation, wind power generation, etc. are representative examples of methods of generating electricity using the forces of nature.

Hitherto, different kinds of power generators using the forces of nature have been proposed.

The construction of a patent of the type that is an application for a typical conventional power generator using the forces of nature is as follows. A first conveyor belt is rotatably supported by drive rollers which are disposed on both sides. A plurality of resistant plates are attached to the conveyor belt. Support protrusions of a second conveyor belt support the resistant plates. A gear box is connected to one of the drive rollers. A power generating unit is connected to the gear box.

Such a conventional technique uses the support protrusions to prevent the force of flowing water applied to the resistant plates from displacing the resistant plates from their correct positions or from rotating the resistant plates over 90°.

However, the support protrusions are disposed on the rear surfaces of the respective resistant plates and support the resistant plates in only one direction. Thus, if the direction of the flow of water reverses, the conventional power generator cannot be used unless its structure is changed.

Therefore, if the direction of the flow of water is changed, the conventional water power generator forces a user to re-install it to change its orientation, thus inconveniencing the user, and incurring expenses.

SUMMARY OF THE INVENTION

Accordingly, the present invention has been made keeping in mind the above problems occurring in the prior art, and an object of the present invention is to provide a rope-conveyor structure for supporting plates of a wind or water power generator in which the positions of connection wires for supporting the plates can be selectively changed so that each connection wire can support the corresponding plate in either of both directions.

In order to accomplish the above object, the present invention provides a rope-conveyor structure for supporting plates of a wind or water power generator in which the plates are coupled to a rope at positions spaced apart from each other so that a force that flowing water or wind applies to the plates rotates the rope, the rope-conveyor structure including: couplings coupled to the rope between the plates; and connection wires connected at first ends thereof to the respective couplings and connected at second ends thereof to the respective plates, each of the connection wires having a predetermined length.

Each of the couplings may be fastened around the rope, with a connection ring provided under the coupling.

Furthermore, a fastener may be provided on the first end of each of the connection wires. The fastener may be removably coupled to the corresponding coupling so that the connection wire is able to be coupled to either of the couplings that are disposed ahead of and behind of the corresponding plate.

The fastener of each of the connection wires may include a lobster clasp configured such that a lever is pushed to open a portion of a ring-shaped part and form an opening and is released to close the opening.

The effects of the present invention are as follows.

The positions of connection wires can be selectively adjusted. Thus, even if the direction of the flow of water is changed, the connection wires can reliably support plates. Therefore, the plates can be prevented from being displaced from the correct positions or being twisted, regardless of the direction of flow of the water.

The connection structure of each connection wire is simple so that operating it is easy, and additional re-installation cost is not required.

Figure 1:
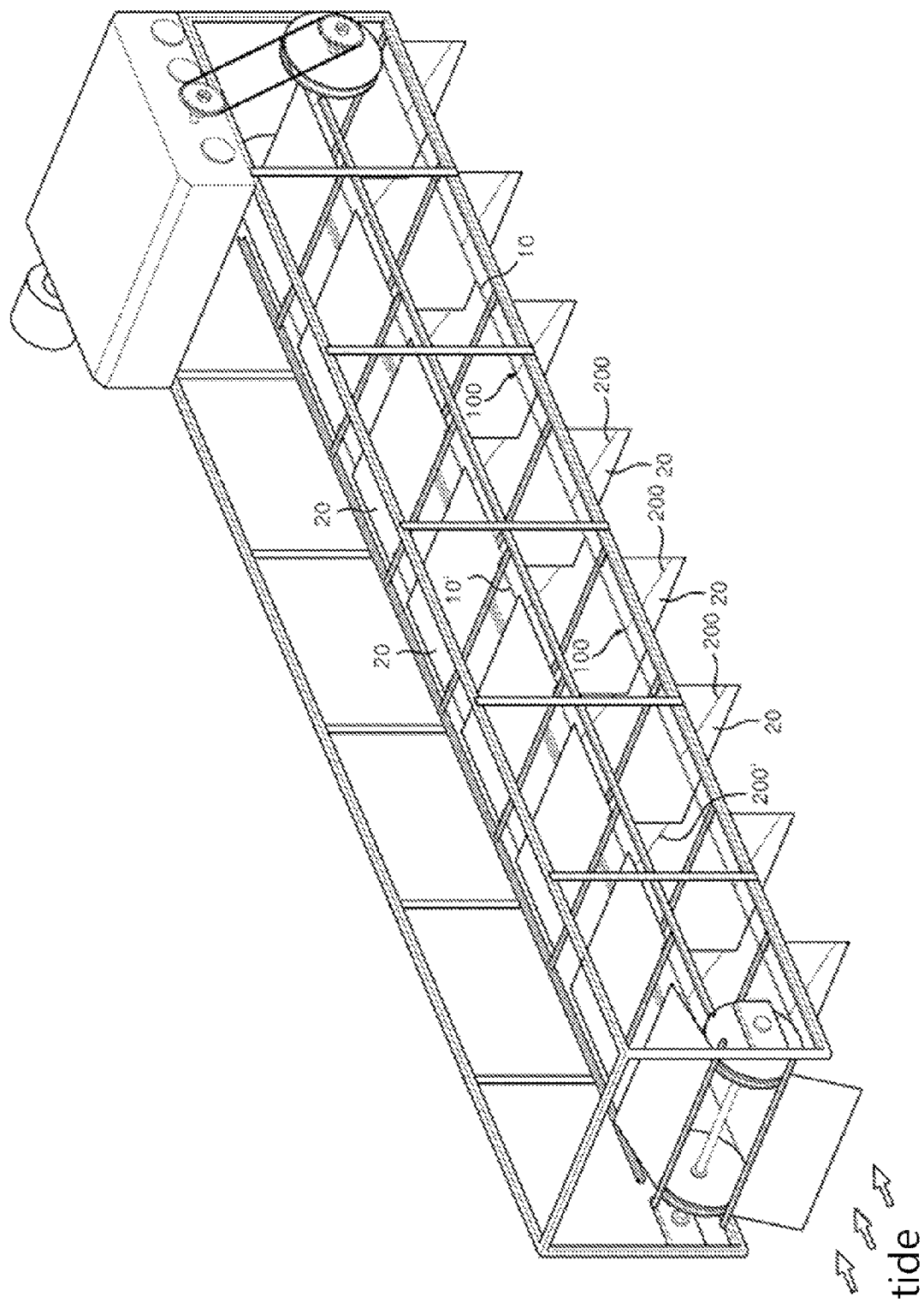
FIG. 1 is a perspective view showing a wind or water power generator having a rope-conveyor structure, according to a preferred embodiment of the present invention.

DESCRIPTION OF THE REFERENCE NUMERALS IN THE DRAWINGS 10,10': rope
20: plate
100,100': coupling
110: connection ring
200,200': connection wire
210: fastener
220: opening

DETAILED DESCRIPTION OF THE INVENTION

Hereinafter, a rope-conveyor structure for supporting plates of a wind or water power generator according to the present invention will be described in detail with reference to the attached drawings.

FIG. 1 is a perspective view showing a wind or water power generator having a rope-conveyor structure, according to a preferred embodiment of the present invention.

Figure 2:
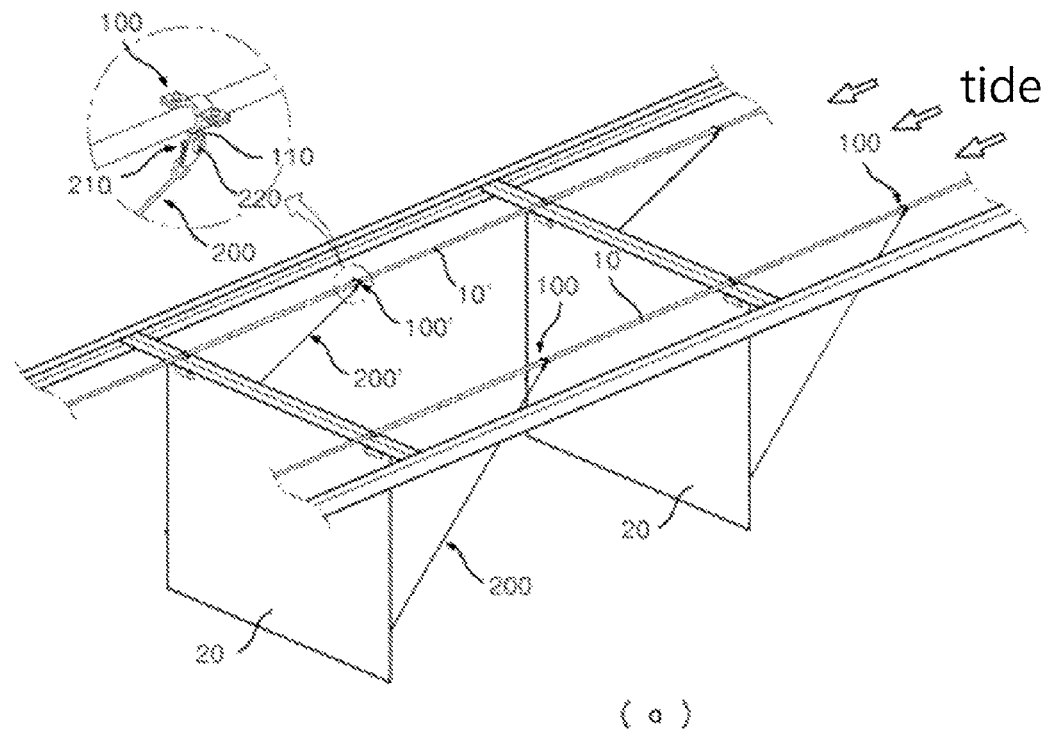
FIG. 2a is a view illustrating the rope-conveyor structure when the tide flows rearwards according to the preferred embodiment of the present invention.
FIG. 2b is a view illustrating the rope-conveyor structure when the tide flows forwards according to the preferred embodiment of the present invention.
Figure 2:
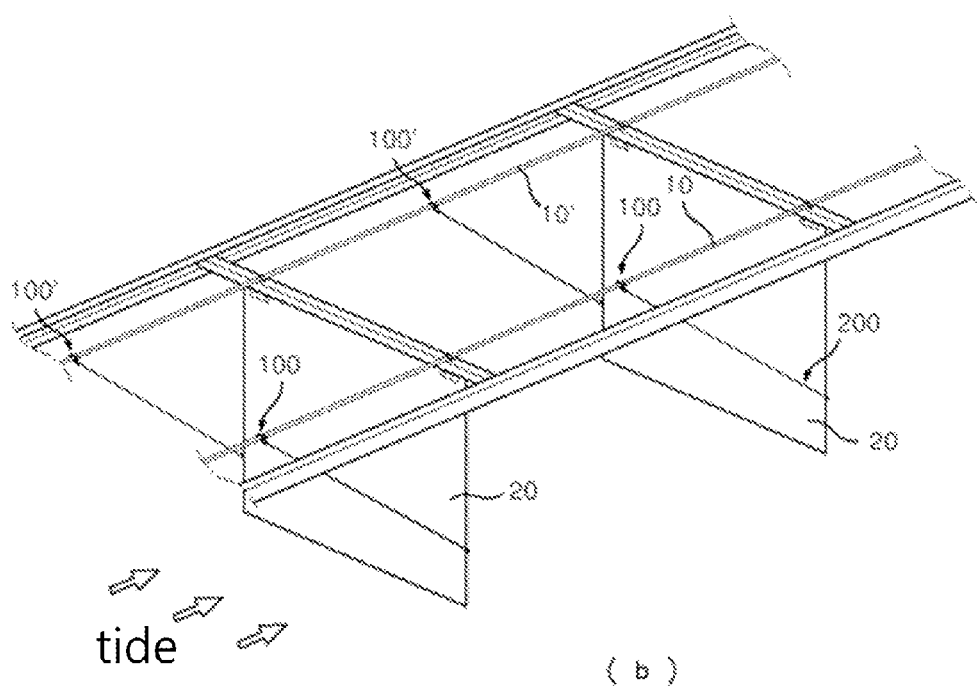

FIG. 2a is a view illustrating the rope-conveyor structure when the tide flows rearwards according to the preferred embodiment of the present invention. FIG. 2b is a view illustrating the rope-conveyor structure when the tide flows forwards according to the preferred embodiment of the present invention.

As shown in the drawings, the rope-conveyor structure according to the present invention includes a rope 10 and a plurality of plates 20 which are coupled to the rope 10 at positions spaced apart from each other in the longitudinal direction of the rope 10. The force of flowing water or wind which is applied to the plates 20 rotates the rope 10. The rope-conveyor structure further includes couplings 100 and connection wires 200.

The couplings 100 will be explained below.

The couplings 100 are provided on the rope 10 which connects the plates 20 to each other.

In detail, each coupling 100 is fastened around the rope 10. A connection ring 110 is provided under a lower end of the coupling 100.

The coupling 100 is disposed on the rope 10 at a medial position between the adjacent two plates 20. In the embodiment, the rope 10 comprises a pair of ropes 10 and 10' which are adjacent to each other. The couplings 100 are provided on the ropes 10 and 10' at positions facing each other.

The material used for each coupling 100 is preferably a rigid material, such as stainless steel or the like.

Next, the connection wires 200 will be explained.

Each connection wire 200 has a predetermined length. A first end of the connection wire 200 is connected to the corresponding coupling 100, and a second end thereof is connected to the corresponding plate 20.

As such, the connection wire 200 connects the coupling 100 to the corresponding plate 20 so that the plate 20 can be prevented from bending over 90°.

It is preferable for the connection wire 200 to be connected to a lower portion of the corresponding plate 20 to prevent the plate 20 from twisting or becoming displaced from the correct position.

In the embodiment, to support the plate 20 by the ropes 10 and 10', opposite sides of the lower portion of each plate 20 are connected to the ropes 10 and 10' by respective connection wires 200 and 200'. Thus, the force of flowing water can be prevented from twisting the plate 20 or displacing it from the correct position.

Preferably, a strong material, such as a steel wire or the like, is used to make each connection wire 200 so that it is not easily cut or abraded.

Particularly, in the present invention, a fastener 210 is provided on the first end of each connection wire 200. The fastener 210 is removably coupled to the corresponding coupling 100. Thereby, the connection wire 200 can be selectively coupled to either of the couplings 100 that are disposed ahead of and behind of the plate 20.

The reason for changing the coupling position of the connection wire 200 is because the direction of the flow of water may change rather than being constant, so that the connection wire 200 must be able to support the plate 20 in the direction corresponding to the direction of flow of the water.

As shown in FIG. 2a, if the tide flows to the front surfaces of the plates 20, each connection wire 200 is coupled to the coupling 100 that is disposed ahead of the corresponding plate 20. As shown in FIG. 2b, if the direction of the flow of the tide changes and flows to the rear surfaces of the plates 20, each connection wire 200 is coupled to the coupling 100 that is disposed behind the corresponding plate 20.

The fastener 210 of the connection wire 200 preferably comprises a lobster clasp. The lobster clasp is configured such that a lever is pushed to open a portion of a ring-shaped hook and form an opening 220 and is released to close the opening 220.

Because pushing the lever makes it easy for the connection wire 200 to be removably coupled to the coupling 100 by a user, the time it takes to change the coupling position of the connection wire 200 is reduced, and the work of making the change is simpler.

As described above, the basic spirit of the present invention is to provide a rope-conveyor structure in which the position of a connection wire that supports a plate can be easily and selectively changed so that the plate can be supported in either of two directions. Those skilled in the art will appreciate that various modifications are possible, without departing from the scope and spirit of the invention as disclosed in the accompanying claims.

What is claimed is:

1. A rope-conveyor structure for supporting plates of a wind or water power generator in which the plates are coupled to a rope at positions spaced apart from each other so that a flowing force of a fluid applying to the plates rotates the rope, the rope-conveyor structure comprising:
   a plurality of couplings connected to the rope between the respective plates; and
   a plurality of connection wires having first ends thereof connected to the respective couplings and second ends thereof connected to the respective plates,
   wherein a fastener is provided at the first end of each of the connection wires, the fastener being detachably coupled to the corresponding coupling so that the connection wire is able to be selectively coupled to one of the couplings that is disposed either ahead of or behind the corresponding plate.

2. The rope-conveyor structure according to claim 1, wherein the fastener of each of the connection wires comprises a lobster clasp configured such that a lever is pushed to open a portion of a ring-shaped part and form an opening and is released to close the opening.

3. The rope-conveyor structure according to claim 1, wherein each of the couplings is fastened around the rope, and with a connection ring provided under the coupling.

* * * * *